US012170167B2

(12) United States Patent
Jilke et al.

(10) Patent No.: US 12,170,167 B2
(45) Date of Patent: Dec. 17, 2024

(54) ELECTROMAGNETIC ACTUATING DEVICE FOR A VARIABLE VALVE DRIVE

(71) Applicant: Schaeffler Technologies AG & Co. KG, Herzogenaurach (DE)

(72) Inventors: Marco Jilke, Sand am Main (DE); Florian Hacker, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 178 days.

(21) Appl. No.: 17/760,518

(22) PCT Filed: Aug. 14, 2020

(86) PCT No.: PCT/DE2020/100710
§ 371 (c)(1),
(2) Date: Mar. 15, 2022

(87) PCT Pub. No.: WO2021/052528
PCT Pub. Date: Mar. 25, 2021

(65) Prior Publication Data

US 2022/0351889 A1 Nov. 3, 2022

(30) Foreign Application Priority Data

Sep. 16, 2019 (DE) ..................... 10 2019 124 796.9

(51) Int. Cl.

| | |
|---|---|
| ***H01F 7/08*** | (2006.01) |
| ***H01F 7/126*** | (2006.01) |
| ***H01F 7/127*** | (2006.01) |
| ***H01F 7/128*** | (2006.01) |
| ***H01F 7/16*** | (2006.01) |

(52) U.S. Cl.
CPC ............ *H01F 7/081* (2013.01); *H01F 7/126* (2013.01); *H01F 7/127* (2013.01); *H01F 7/128* (2013.01); *H01F 7/1607* (2013.01); *H01F 2007/083* (2013.01)

(58) Field of Classification Search
CPC .......... H01F 7/081; H01F 7/126; H01F 7/128; H01F 7/1206; H01F 2007/083
See application file for complete search history.

(56) References Cited

U.S. PATENT DOCUMENTS

| | | | |
|---|---|---|---|
| 6,265,956 | B1 | 7/2001 | Cascoln et al. |
| 6,967,550 | B2 | 11/2005 | Elendt et al. |

(Continued)

FOREIGN PATENT DOCUMENTS

| | | | |
|---|---|---|---|
| CN | 201402696 | Y | 2/2010 |
| CN | 201435302 | Y | 3/2010 |

(Continued)

OTHER PUBLICATIONS

DE-102019204246-A1, Machine Translation (Year: 2019).*
See Corresponding Search Report for International Application PCT/DE2020/100710.

*Primary Examiner* — Daphne M Barry
(74) *Attorney, Agent, or Firm* — Davidson Kappel LLC

(57) ABSTRACT

An electromagnetic actuating device (8) is for a variable valve drive, in particular electromagnetic switching valve lever systems. The electromagnetic actuating device comprises a base plate (3), a housing which is secured to the base plate (3) and a coil. The housing is designed as a bracket housing (12) and can form part of the magnetic circuit.

17 Claims, 3 Drawing Sheets

(56) References Cited

U.S. PATENT DOCUMENTS

| | | | |
|---|---|---|---|
| 2007/0062591 | A1 | 3/2007 | Armour |
| 2019/0376420 | A1 | 12/2019 | Elendt et al. |

FOREIGN PATENT DOCUMENTS

| | | | | |
|---|---|---|---|---|
| CN | 201663025 U | 12/2010 | | |
| CN | 202957127 U | 5/2013 | | |
| CN | 103363736 A | 10/2013 | | |
| CN | 203606051 U | 5/2014 | | |
| CN | 204878973 U | 12/2015 | | |
| DE | 102017101792 A1 | 8/2018 | | |
| DE | 102019204246 A1 * | 10/2020 | .......... | F15B 13/0402 |
| JP | S56112706 A | 9/1981 | | |
| JP | S57104505 U | 6/1982 | | |
| JP | S61136206 A | 6/1986 | | |
| JP | S61154017 A | 7/1986 | | |
| WO | WO2003021612 A1 | 3/2003 | | |

* cited by examiner

ELECTROMAGNETIC ACTUATING DEVICE FOR A VARIABLE VALVE DRIVE

CROSS-REFERENCE TO RELATED APPLICATIONS

This application is the U.S. National Phase of PCT Appln. No. PCT/DE2020/100710 filed Aug. 14, 2020, which claims priority to DE 10 2019 124 796.9 filed Sep. 16, 2019, the entire disclosures of which are incorporated by reference herein.

TECHNICAL FIELD

The present disclosure relates to an electromagnetic actuating device for a variable valve drive, having the following elements:

a base plate, a housing which is secured to the base plate, and a coil.

BACKGROUND

Such electromagnetic actuating devices are known, for example, from WO 2003/021 612 A1. An electromagnetic actuating device with a yoke, a pole core and an armature is shown. An electromagnetic force generated by a coil acts on the armature, which means that an adjusting pin can be displaced. The elements are held together by a pot-shaped housing.

SUMMARY

It is an object of the present disclosure to simplify the structure of an electromagnetic actuating unit.

The electromagnetic actuating unit has the following elements: a base plate, a housing which is secured to the base plate, and a coil. The housing is designed as a bracket housing. Thus, a linear actuator can be provided which has a simplified housing. The bracket housing can be designed in a U-shape—the housing therefore does not completely enclose the elements surrounded by the bracket housing. Only after being secured to the base plate, the housed elements completely are enclosed; by the bracket housing on one side and by the base plate on the other side. A U-shaped bracket housing can be secured to the base plate along the open side, wherein the legs have securing means. The bracket housing and the base plate thus form the essential elements of the load-bearing structure. The base plate can also form part of the magnetic circuit.

In an advantageous embodiment, the coil is secured to the base plate along its longitudinal side. With this design, assembly can be made easier and the base plate can be included in the magnetic circuit. The coil can be attached to the base plate by means of thermal contact rivets or crush ribs. The coil can thus be mechanically decoupled from the housing in an advantageous manner. The durability of the plastic/metal connection is problematic in particular in the case of a coil overmolded with plastic. The mechanical contact between the soft iron circuit and the coil can, however, be avoided—the coil serves solely as a source of magnetic actuation; the housing only comprises the coil. Instead of the thermal contact rivets, the coil can also be fixed to the base plate by means of pins, for example. Crush ribs can be provided between the coil and the bracket housing and hold the coil on the base plate after deformation.

In an advantageous embodiment, the coil is encapsulated by means of a plastic overmolding. Due to the separate arrangement of the coil, bracket housing and base plate, the coil can be completely encapsulated except for a cable bushing. The coil can thus be protected from external influences, for example from the ingress of engine oil. The coil, cable and connector for connection to the power supply can be uniformly coated with plastic and thus form a one-piece component.

In an advantageous embodiment, the bracket housing at least partially encloses the coil. The bracket housing is designed, for example, in a U-shape with three open sides and two end sides, which can also have openings. One of the open sides extends along the longitudinal side of the coil. Only after it has been fastened to the base plate is the structure that carries the components completed. In an advantageous development, the bracket housing can be designed as a bracket that is open on one side and conducts the magnetic flux in conjunction with the base plate. The two front sides are connected by a web. The end faces are closed, but have openings to accommodate the yoke and pole core.

In an advantageous embodiment, a pole core is formed in one piece with the armature guide sleeve, wherein an actuating pin reaches through an opening in the pole core. It is known from the prior art that the armature guide sleeve is closed by a pole core disk that is pressed in or welded to the armature guide sleeve. The one-piece design of the armature guide sleeve and pole core can thus advantageously shorten the tolerance chain. Further disadvantages are avoided: The unit made up of the armature guide sleeve and pole core can be positioned better compared to a two-part design because, for example, the armature guide sleeve can be prevented from springing back during joining. In addition, damage to the armature guide sleeve can be avoided by reducing the required joining forces.

In an advantageous development, a closure disk forms a press fit with the armature guide sleeve on the side of the armature guide sleeve opposite the pole core. The armature guide sleeve, armature, actuating pin and metal closure disk can form a switching cartridge. The risk of the closure disk migrating during operation is avoided. If the armature guide sleeve is pressed into the bracket housing, a double fit in the area of the pole core slide, armature guide sleeve and bracket housing can be avoided.

In an advantageous development, the armature guide sleeve is materially bonded to the bracket housing in the area of the pole core. The armature guide sleeve can be joined to the coil with almost no force (by providing a clearance fit). The armature guide sleeve is then welded to the bracket housing. The welded connection can ensure that the armature guide sleeve is positioned precisely. For positioning, a stop can be provided on the side of the bracket housing facing the connector. Damage to the armature guide sleeve during joining can be avoided because only low joining forces are required. The welded connection can be designed according to the requirements for the connection with individual weld points. Furthermore, this concept ensures that the magnetic resistance in the transition area between the bracket housing and armature guide sleeve is minimal and thus the power density of the actuator is maximized.

In an advantageous alternative embodiment, the electromagnetic actuating device has an armature guide sleeve. The armature guide sleeve is encompassed by the coil and is not magnetically conductive. The armature guide sleeve can be produced from sheet metal by deep-drawing. In a further development, the electromagnetic actuating device has an armature. The armature is guided into the armature guide sleeve. In a further development, the electromagnetic actuating device has a pole core. The pole core is materially bonded to the armature guide sleeve, forms a switching cartridge and is connected to the bracket housing. The material bond can be established by means of laser welding. The connection with the bracket housing can be made by means of a press fit.

In an advantageous embodiment, the electromagnetic actuating device has a yoke. The yoke is tubular and connected to the bracket housing. The connection can be established by means of a press fit.

The electromagnetic actuating device is intended for use in a variable valve train. The design with a base plate arranged parallel to the effective direction makes it possible to use it, in particular, for electromechanical switching valve lever systems.

BRIEF SUMMARY OF THE DRAWINGS

An exemplary embodiment explains the present disclosure on the basis of the following figures.

DETAILED DESCRIPTION

Figure 1:
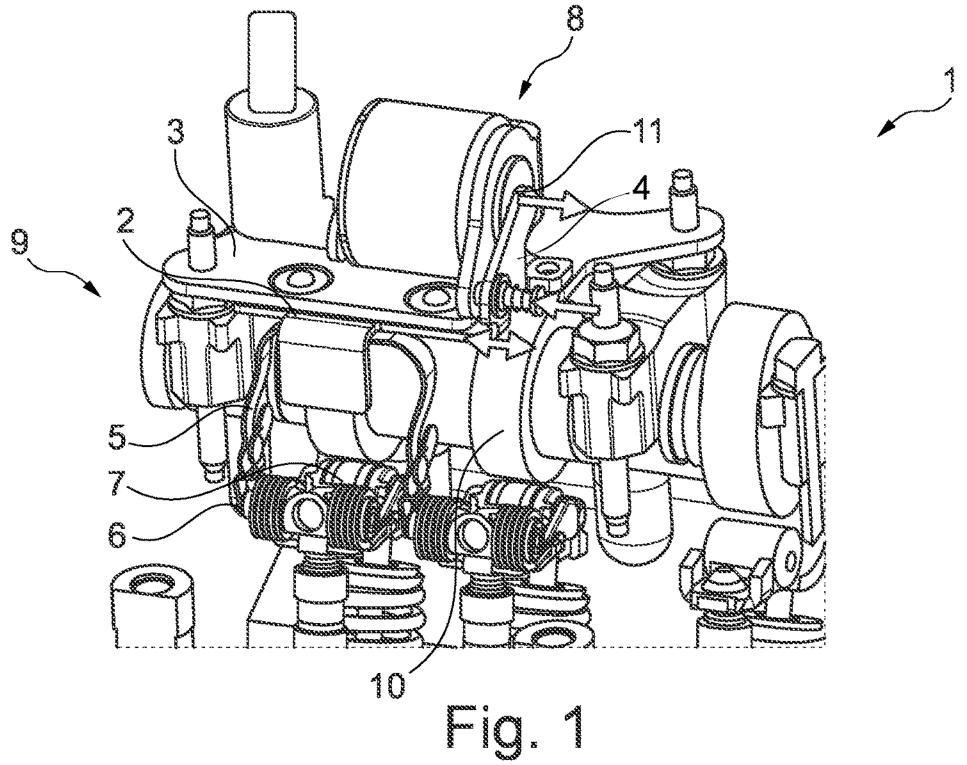
FIG. 1 shows the basic structure of an electromechanical switching valve lever system.

FIG. 1 shows the basic structure of an electromechanical switching valve lever system 1 as it is known, for example, from DE 10 2017 101 792 A1. A switching strip 2 is arranged on a base plate 3 and is in operative connection therewith. The mechanism has an angle 4 mounted on the base plate 3, the end of which is connected to the switching strip 2. The switching strip 2 is connected to two connecting elements 5 and is displaceable so that the switching pins 6 of two adjacent valve levers 7 can be actuated. The switching strip 2 is switched by an electromagnetic actuating device 8 designed as a linear actuator.

This has the following advantages: On the one hand, the electromagnetic actuating device 8 does not result in an extension of the cylinder head 9 in the case of an installation associated with the modular structural unit. This means that the installation environment can be adopted without any changes or with only slight adjustments. On the other hand, modules can be used which are equipped with a short structural unit with a switching strip 2, two connecting elements 5 and a base plate 3.

In the simplest case, these modules can be plugged into the cover of the cylinder head 9 and secured. By reducing the number of controlled valve levers 7, the module can be controlled by an electromagnetic actuating device 8, the structure of which basically corresponds to that of devices that are used, for example, as electromagnets in proportional and switching valves in the area of camshaft adjusters or other variable valve trains. The general requirements are therefore lower than for electromagnetic actuating devices that are used to operate more than two valve levers.

The mechanism has angle 4 mounted on the base plate 3, the end of which is connected to the switching strip 2. This ensures reliable guidance of the switching strip 2. The electromagnetic actuating device 8 is secured essentially parallel to the camshaft 10 mounted in the cylinder head with the base plate 3, which in turn is arranged essentially parallel to the camshaft 10. An actuating pin 11 of the electromagnetic actuating device is in operative connection with angle 4 arranged on the switching strip 2. Overall, this results in a very compact structural unit.

Figure 2:
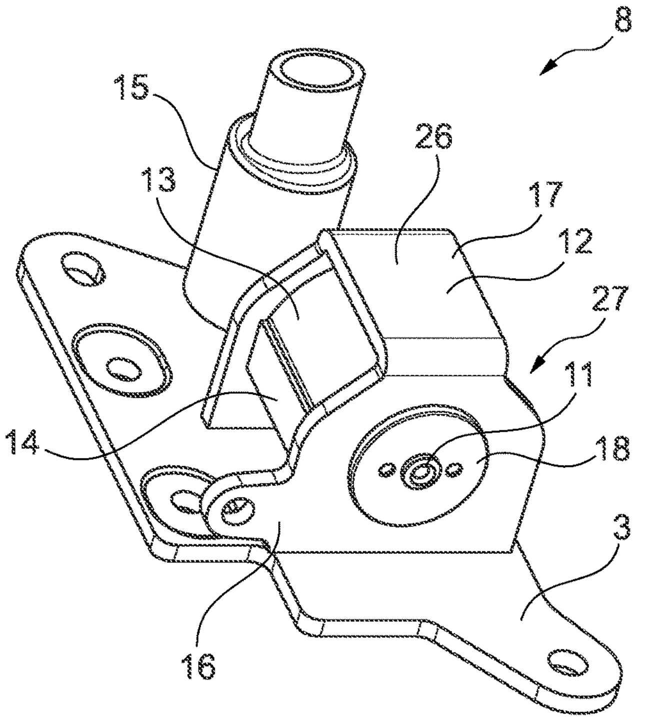
FIG. 2 shows an electromagnetic actuating device.

FIG. 2 shows the electromagnetic actuating device 8 with base plate 3, a bracket housing 12 fastened to the base plate and with a coil 13. The coil 13 is overmolded with plastic and thus protected against influences from the environment. The plastic overmolding 14 at the same time encases the supply lines and forms a connector 15 for supplying voltage to the coil 13. The unit made up of the coil 13 and connector 15 is secured to the base plate 3.

The bracket housing 12 is formed from two end faces 16 which are connected to one another on the longitudinal side 26 via a web 17. The end face 16 facing away from the connector 15 has an opening into which a pole core 18 is pressed. An actuating pin 11 protrudes through the pole core 18. Opposite the web 17 is the open side of the bracket housing 12, which is U-shaped as a bracket 27.

Figure 3:
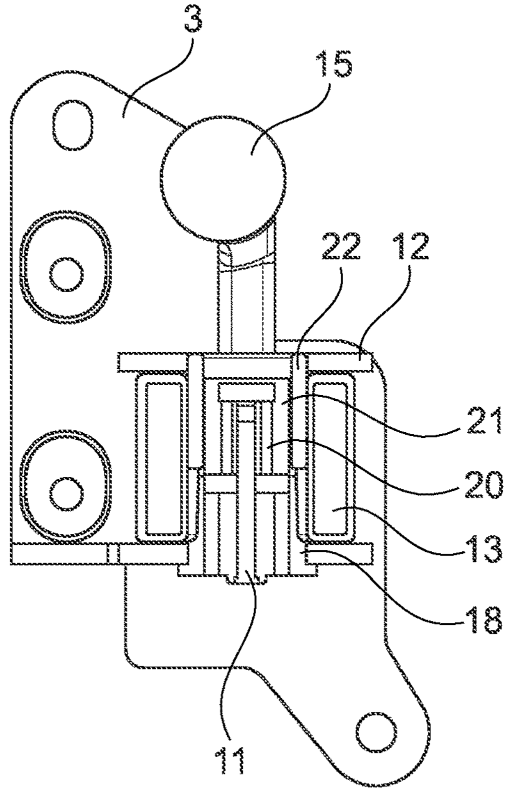
FIG. 3 shows a sectional representation of the electromagnetic actuating device from FIG. 2.

FIG. 3 shows a sectional representation of the electromagnetic actuating device 8 from FIG. 2 with base plate 3, with a unit made up of coil 13 and connector 15 and bracket housing 12. The bracket housing 12 has two end faces 16. The end face 16 facing away from the connector has an opening into which the pole core 18 is pressed. The pole core 18 is connected to an armature guide sleeve 19 (FIG. 6) by means of laser welding and forms a switching cartridge 20 which receives the armature 21 which is connected to the actuating pin 11. The opposite end face 16 has an opening into which the yoke 22 is pressed. The yoke 22 is designed as a tube.

FIG. 3 illustrates the advantages over electromagnetic actuating devices from the prior art. First, the structure of the yoke can be simplified. The yoke is arranged in the immediate vicinity of the housing, whereby the yoke can be designed as a tube. Second, it is not necessary to design the coil with inserts—there is no need for seals. Seals can also be omitted in the area between the pole core 18 or switching cartridge 20 and the coil 13.

Figure 4:
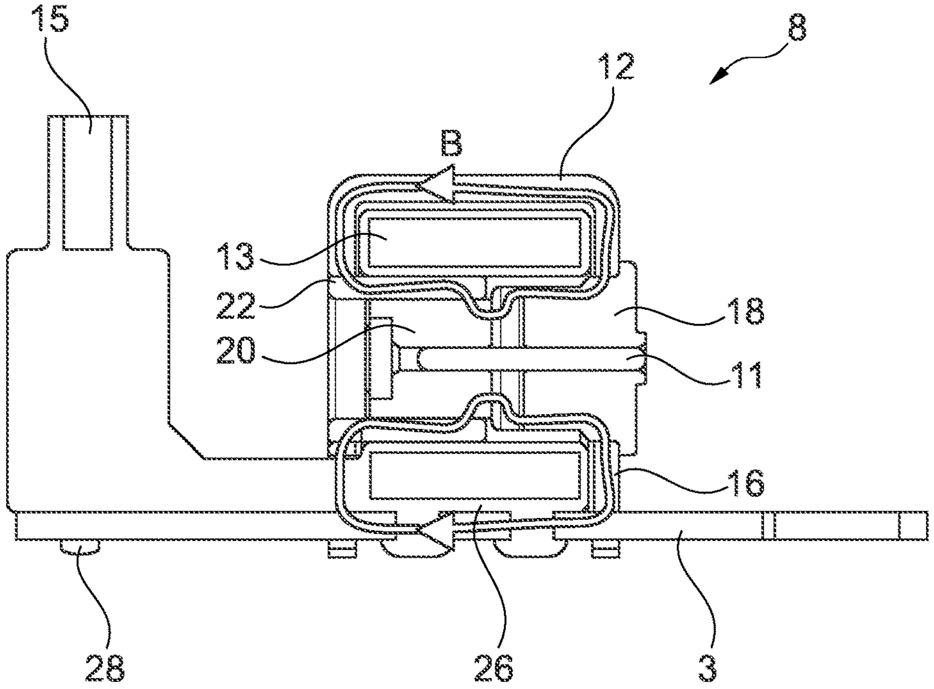
FIG. 4 shows the magnetic circuit along the bracket housing and base plate.

The advantages of the bracket housing 12 are illustrated in FIG. 4. The base plate 3 is shown with the unit made up of the coil 13 and connector 15 and with the bracket housing 12, through one end face 16 of which the unit made up of the coil 13 and connector 15 engages. The magnetic circuit extends along the bracket housing, but also along the base plate: the open side of the bracket housing 12 is located on the side opposite the web 17. The magnetic circuit is conducted via the base plate 3, which thus enables the housing to be designed in a U-shape.

Figure 5A:
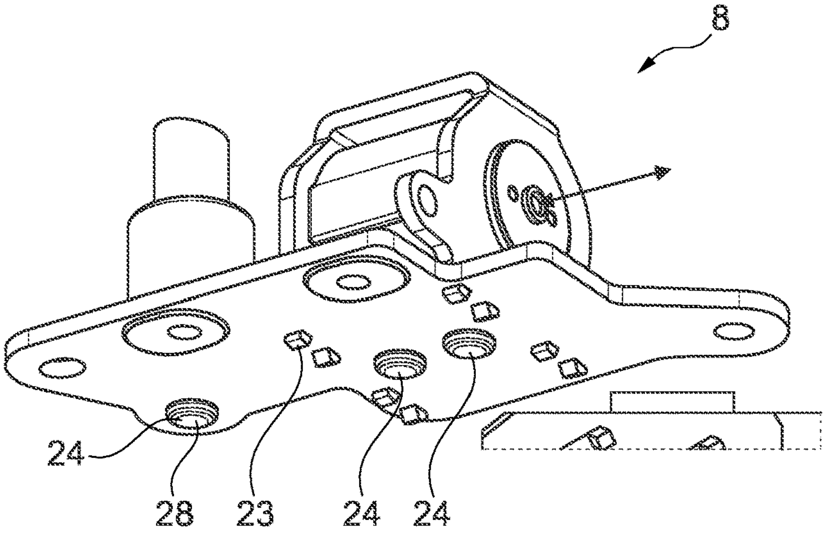
FIG. 5*a* shows the securing of the electromagnetic actuating unit.

FIG. 5*a* shows the electromagnetic actuating unit with the base plate 3, with the unit made up of the coil 13 and connector 15 and with the bracket housing 12. The underside of the base plate shows how the bracket housing is attached to the base plate. Fastening elements 23 of the bracket housing engage through openings in the base plate, then the connection is made by means of a form fit. The connection is orthogonal to the direction of force and is therefore particularly stable.

It is also shown how a connection between the unit made up of the coil 13 and connector 15, on the one hand, and the base plate 3, on the other hand, can be implemented. Thermal contact rivets 24 reach through the base plate 3 and establish a connection. Alternatively, the unit made up of the coil 13 and connector 15 can also be secured to the base plate by means of pins (not shown). The unit is held after assembly of the bracket housing 12, which holds the coil 13 in position as shown in FIG. 5*b* by means of crush ribs 25.

Figure 5B:
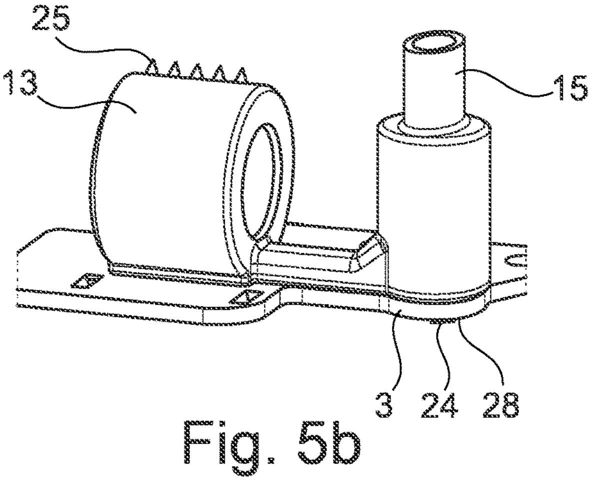
FIG. 5*b* shows alternative securing of the coil.

FIGS. 5*a* and 5*b* show the advantages of the unit made up of the coil 13 and connector 15. The unit is secured to the base plate 3 in close proximity to the connector 15, among other things. A securing point 28 is located in close proximity to the connector. In this way, it can be ensured that the connector can be positioned in the correct position relative to the connection environment. In the prior art, existing tolerances of the components between the securing of the coil body and the connector unit add up to a chain of tolerances that does not allow accurate positioning. For example, when the electromagnetic actuating device 8 is arranged in a cylinder head, it must be possible to position the connector 15 in such a way that the connector 15 engages through openings in the cylinder head cover placed on the cylinder head.

Figure 6:
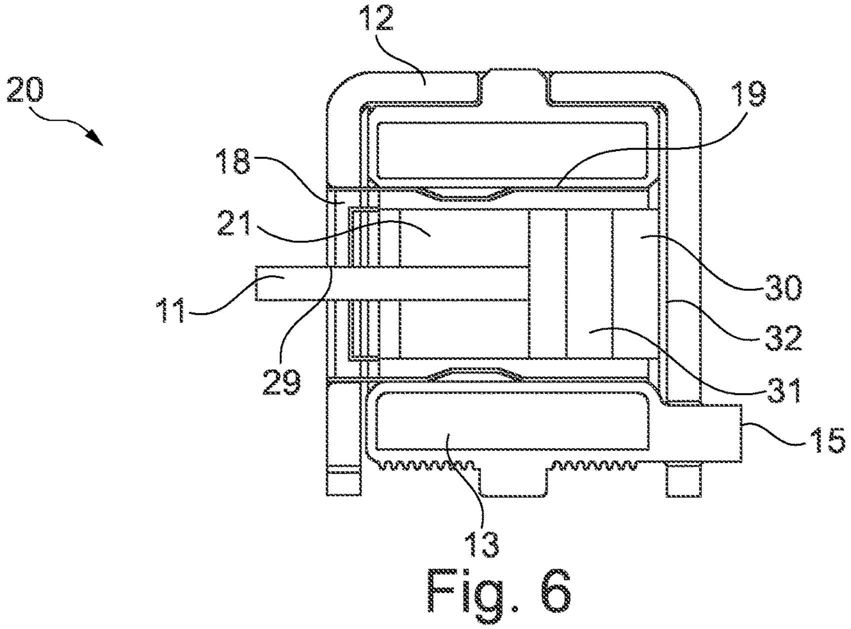
FIG. 6 shows a switching cartridge.

FIG. 6 shows the switching cartridge 20 with the pole core 18, the armature guide sleeve 19, the armature 21, the actuating pin 11, a closure disk 30 and a stop disk 31. The stop disk 31 is made of plastic and prevents the armature 21 from sticking to the bracket housing 12 or to the closure disk 30. The actuating pin 11 is pressed into a receptacle in the armature 21. The unit made up of the armature 21 and actuating pin 11 is then inserted into armature guide sleeve 19 so that the actuating pin engages through an opening 29 of the pole core 18, which is designed in one piece with the armature guide sleeve.

The closure disk 30 on the side of the armature guide sleeve 19 opposite the pole core 18 forms a press fit with the armature guide sleeve 19. The armature guide sleeve 19, armature 21, actuating pin 11 and closure disk 30 are thus combined to form a switching cartridge 20.

The armature guide sleeve 19 or the switching cartridge 20 is materially bonded to the bracket housing 12 in the area of the pole core or in the area of the opening 29, which is arranged on the side opposite the connector 15. The armature guide sleeve 19 is thus joined to the coil 13 with almost no force (by providing a clearance fit). The armature guide sleeve 19 is then welded to the bracket housing 12. The welded connection ensures that the armature guide sleeve 19 can be positioned precisely. For positioning, a stop 32 is provided on the side of the bracket housing facing the connector. Damage to the armature guide sleeve 19 during joining can be avoided because only low joining forces are required. The welded joint consists of only individual weld points. This concept ensures that the magnetic resistance in the transition area between the bracket housing 12 and armature guide sleeve 19 is minimal and thus the power density of the actuator is maximized.

LIST OF REFERENCE SIGNS

1 Switching valve lever system
2 Switching strips
3 Base plate
4 Angle
5 Connecting element
6 Switching pin
7 Valve lever
8 Electromagnetic actuating device
9 Cylinder head
10 Camshaft
11 Actuating pin
12 Bracket housing
13 Coil
14 Plastic overmolding
15 Connector
16 Rear face
17 Web
18 Pole core
19 Armature guide sleeve
20 Switching cartridge
21 Armature
22 Yoke
23 Securing elements
24 Thermal contact rivets
25 Crush ribs
26 Longitudinal side
27 Bracket
28 Securing point
29 Opening
30 Closure disk
31 Stop disk
32 Stop

What is claimed is:

1. An electromagnetic actuating device comprising:
a base plate;
a housing which is secured to the base plate;
a coil, the housing being a bracket housing;
a connector for supplying voltage to the coil, the connector being fixed to the base plate; and
an armature guide sleeve encompassed by the coil, and an armature in the armature guide sleeve,
wherein a pole core is formed in one piece with the armature guide sleeve, wherein an actuating pin engages through an opening in the pole core.

2. The electromagnetic actuating device according to claim 1, wherein the coil is secured to the base plate along a longitudinal side thereof.

3. The electromagnetic actuating device according to claim 2, wherein the coil is secured to the base plate by thermal contact rivets or crush ribs.

4. The electromagnetic actuating device according to claim 1, wherein the coil is encapsulated by a plastic overmolding that forms the connector.

5. The electromagnetic actuating device according to claim 1, wherein the bracket housing at least partially encompasses the coil.

6. The electromagnetic actuating device according to claim 1, wherein the bracket housing is a bracket that is open on one side and conducts a magnetic flux in conjunction with the base plate.

7. The electromagnetic actuating device according to claim 1, wherein a closure disk on a side of the armature guide sleeve opposite the pole core forms an press fit with the armature guide sleeve.

8. The electromagnetic actuating device according to claim 1, wherein the armature guide sleeve is materially bonded to the bracket housing in an area of the pole core.

9. A method of constructing an electromagnetic actuating device comprising:
securing a bracket housing to a base plate;
inserting a coil into the bracket housing; and
encasing the coil in a plastic overmolding that forms a connector on the base plate for supplying voltage to the coil.

10. The method as recited in claim 9, wherein the bracket housing includes two end faces and a web connecting the two end faces, the coil being inserted axially between the two end faces.

11. The method as recited in claim 10, further comprising pressing a pole core through one of the two end faces, the coil surrounding the pole core.

12. The method as recited in claim 11, further comprising providing an actuating pin protruding through the pole core.

13. The method as recited in claim 12, further comprising connecting the pole core to an armature guide sleeve to form a cartridge receiving an armature connected to the actuating pin.

14. An electromechanical switching valve lever system comprising:

an electromagnetic actuating device including:

a base plate;

a bracket housing connected to the base plate;

a coil held inside the bracket housing, the bracket housing including two end faces and a web connecting the two end faces, the coil being inserted axially between the two end faces; and a switching strip arranged on the base plate and in operative connection therewith, the switching strip being switchable by the electromagnetic actuating device.

15. The electromechanical switching valve lever system as recited in claim 14, further comprising a switching cartridge extending through a first of the two end faces and an armature received in the switching cartridge.

16. The electromechanical switching valve lever system as recited in claim 15, further comprising a yoke formed as a tube extending through a second of the two end faces.

17. The electromechanical switching valve lever system as recited in claim 14 wherein the electromagnetic actuating device is configured for being positioned on top of a cylinder head.

* * * * *